Figure 1:
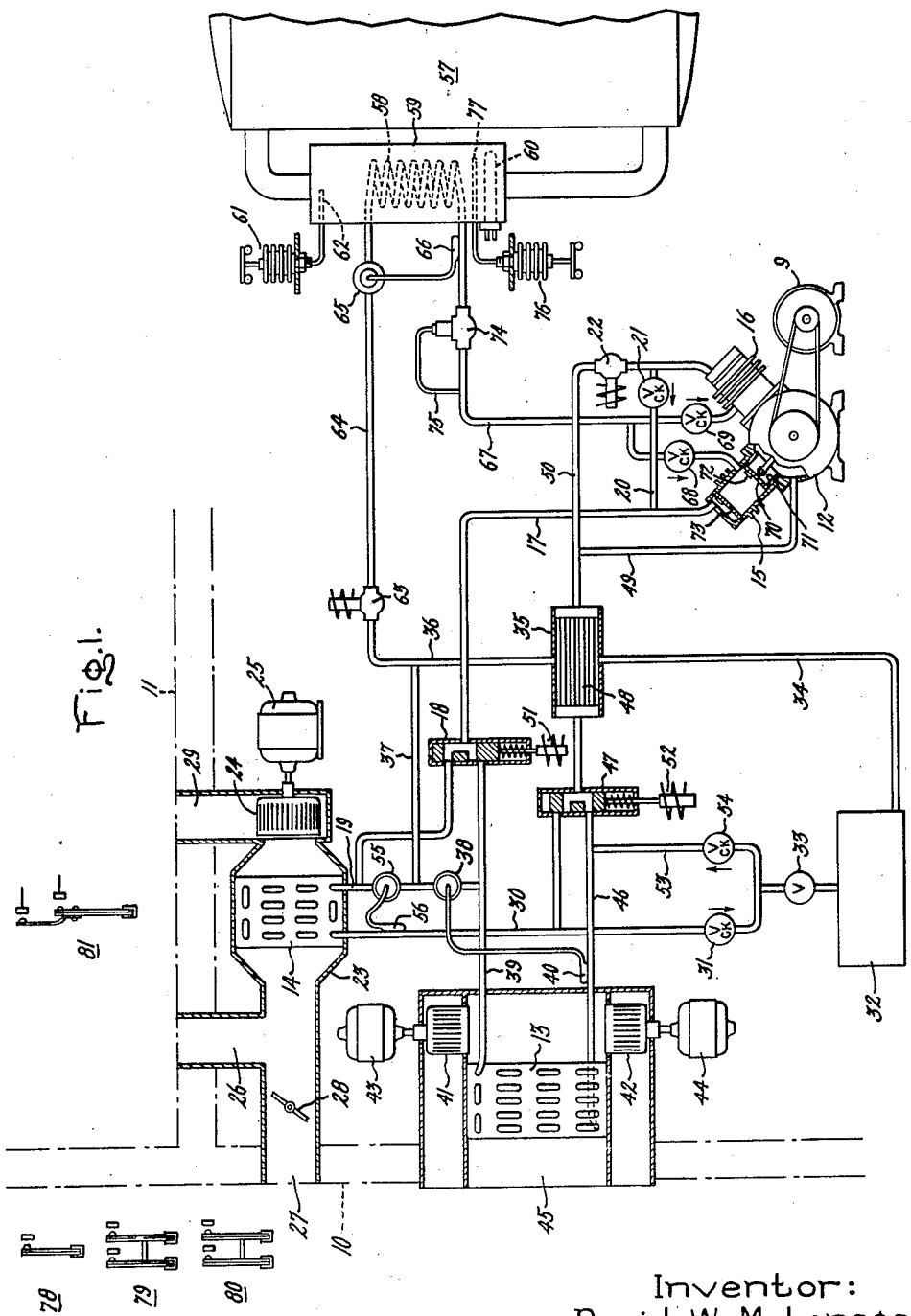

Nov. 25, 1952     D. W. McLENEGAN     2,619,326
FLUID HEATING SYSTEM, INCLUDING A HEAT PUMP
Filed Nov. 29, 1949     2 SHEETS—SHEET 2

Inventor:
David W. McLenegan,
by William G. Edwards, Jr.
His Attorney.

Patented Nov. 25, 1952

2,619,326

UNITED STATES PATENT OFFICE 2,619,326

FLUID HEATING SYSTEM, INCLUDING A HEAT PUMP

David W. McLenegan, Richland, Wash., assignor to General Electric Company, a corporation of New York Application November 29, 1949, Serial No. 130,048

8 Claims. (Cl. 257—3)

This invention relates to refrigerating machines of the compression type and particularly to such machines employed as heat pumps for heating air or other fluid and utilizing outdoor air as a source of heat.

In many localities the heat pump offers a very satisfactory method of heating buildings and, in addition, may be employed for cooling the building during hot weather. One of the principal difficulties encountered in the design of heat pumps lies in the necessity of providing a suitable source of heat. Well water in sufficient quantities is one of the best heat sources; however, sufficient well water with temperatures in a satisfactory range is somewhat rare in many localities where substantial heating is required. Alternatively, heat may be absorbed from the earth by heat transfer surface buried below the ground surface; but the low thermal conductivity of certain soils may require heat exchangers of excessive size. For these reasons the type of heat pump which employs the outdoor air as a heat source has been studied extensively. It will be realized that under cold weather conditions when there is the greatest demand for heating, the outdoor air is a relatively poor source of heat and, furthermore, the coefficient of performance of the refrigerating machine falls with the reduction of evaporator temperature. Accordingly, it is an object of this invention to provide an improved heat pump employing outdoor air as a source of heat and which may operate effectively under conditions of low outdoor air temperature.

It is another object of this invention to provide a heat pump employing outdoor air as a source of heat and including an improved arrangement for utilizing a second or auxiliary source of heat to maintain the effective performance of the heat pump during cold weather conditions.

It is a further object of this invention to provide a heat pump employing outdoor air as a source of heat and having a heat storage reservoir and an improved arrangement for utilizing the reservoir to supply heat under transient peak demand conditions.

Further objects and advantages of this invention will become apparent as the following description proceeds, and the features of novelty which characterize the invention will be pointed out with particularity in the claims annexed to and forming a part of this specification.

In carrying out the objects of this invention there is provided a heat pump including a compressor and a condenser and an evaporator connected in a refrigerant circuit, the evaporator being arranged to receive heat from outdoor air. In order to meet the demands for additional heat during peak load conditions in severe winter weather an additional source of heat is provided which may, for example, be a heat storage tank. The compressor unit is constructed and arranged to withdraw heat from the additional source upon demand and to supply it to the condenser, thereby increasing the total heat delivered although reducing the supply of heat received through the main evaporator. In a preferred embodiment a compressor of the multiple effect type is employed and the evaporator for the additional source is arranged to be connected to the high pressure intake. In another embodiment a compressor having a main cylinder and a separate normally unloaded cylinder is employed for this purpose.

Figure 2:
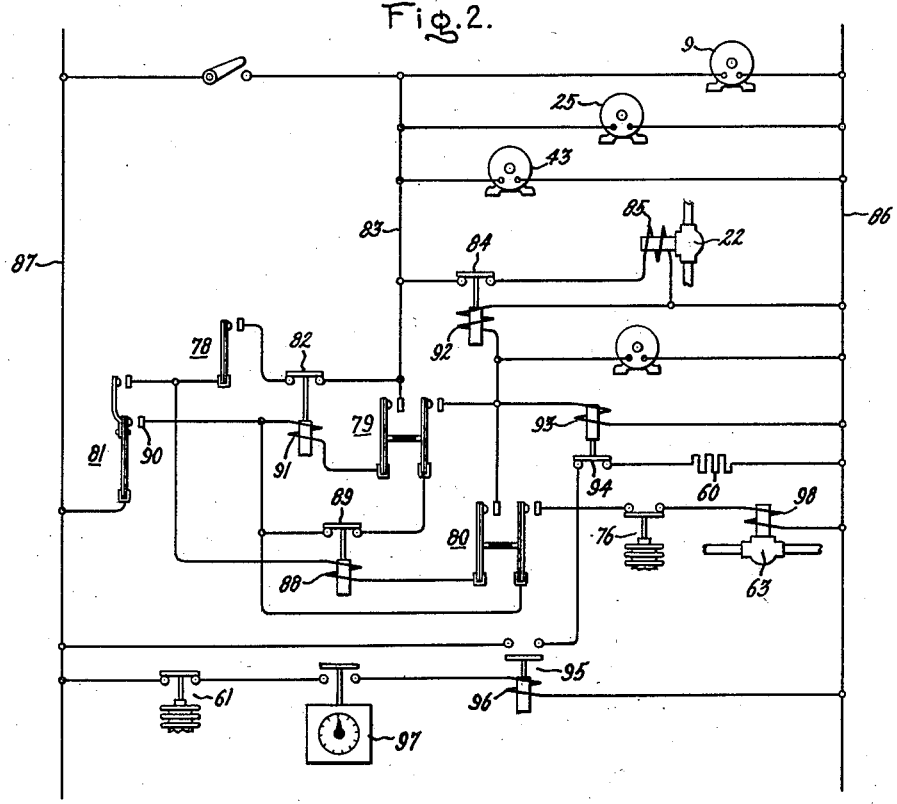
Figure 3:
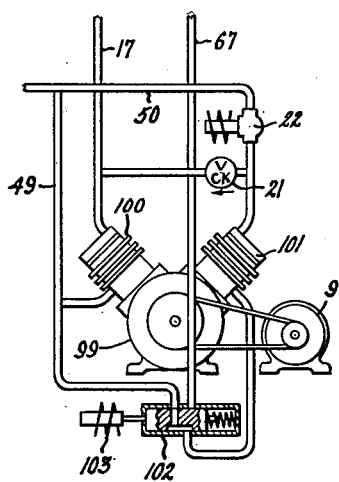
Figure 4:
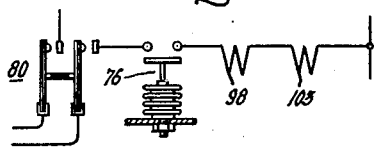

For a better understanding of this invention, reference may be had to the accompanying drawing in which Fig. 1 is a diagrammatic view of a heat pump embodying the invention; Fig. 2 is an across-the-line wiring diagram of the control circuits of the heat pump; Fig. 3 is a diagrammatic view illustrating a modification of the invention; and Fig. 4 is a wiring diagram of a portion of the control circuit for the system of Fig. 3.

Referring now to the drawing, the heat pump illustrated in Fig. 1 is arranged within a house or building the outer wall of which is indicated generally by the vertical dot and dash lines 10. The heat pump comprises a refrigerating machine of the compression type arranged within a machinery room or basement defined by the main floor or other partition wall or other enclosure, as indicated by the horizontal dot and dash lines 11. The refrigerating machine includes a multi-cylinder compressor 12 driven by an electric motor 9, an outside air heat exchange unit 13, and an indoor air heat exchange unit 14, all connected in a refrigerant circuit. For purposes of illustration, the compressor has been shown as comprising two cylinders 15 and 16 respectively. The cylinder 15 discharges directly into a line 17 connected to the indoor heat exchanger through a change-over valve 18 and an inlet connection 19. The cylinder 16 discharges compressed gas through a cross connection 20 to the line 17 through a check valve 21 provided a solenoid valve 22 is closed. Thus the compressed refrigerant from both cylinders may be supplied directly to the indoor heat transfer unit 14. Heat is removed from the unit 14 by air circulated thereover through a duct 23 by operation of a blower 24 driven by an electric motor 25. The air circulating through the duct 23 may be all indoor air received through a connection 26 or it may be mixed with a portion of outdoor fresh air received through a duct 27 and controlled in amount by a damper 28. The heated air is distributed to the interior of the building through a suitable duct 29. The hot compressed refrigerant cooled in the unit 14 is condensed and the liquid refrigerant flows through an outlet line 30 and a check valve 31 to a liquid receiver 32, a manual shut-off valve 33 being provided between the line 30 and the receiver for servicing purposes. The liquid refrigerant then flows from the receiver through a line 34 to a heat exchanger 35 and thence through connections 36 and 37 to a thermostatic expansion valve 38. This valve regulates the flow of refrigerant to the heat transfer unit 13 through an inlet connection 39, it being provided with a thermal control bulb 40 responsive to the temperature of the vaporized refrigerant withdrawn from the unit 13. Outside air is delivered to the unit 13 by operation of two fans 41 and 42 driven by motors 43 and 44 respectively and arranged to circulate air from an inlet duct 45 over the coils of the heat transfer unit 13 and thence out through discharge ducts on either side of the inlet duct. The refrigerant vaporized in the unit 13 flows through a suction line 46 and through a two-way valve 47 to the heat exchanger 35 within which it passes through a plurality of tubes 48 and thence out to a suction line 49 of the compressor. It will thus be apparent that upon operation of the compressor with the valves 18 and 47 in the positions shown, heat obtained from the outside air by operation of the unit 13 as an evaporator is delivered by the compressor to the unit 14 operating as a condenser and heating the air circulated to the interior of the building. The heat exchanger 35 provides the conventional exchange of heat between the hot liquid refrigerant and the cold vaporized refrigerant.

In the event that the full capacity of the compressor 12 is not required, the cylinder 16 may be unloaded by opening the solenoid valve 22 whereupon the gas discharged from the cylinder 16 is returned through a bypass connection 50 directly to the suction line 49 of the compressor, the check valve 21 remaining closed due to the higher pressure in the connection 20 when the valve 22 is open.

During the summer it may be desirable to provide cooling of the air within the enclosure and this may be accomplished by energizing solenoids 51 and 52 of the valves 18 and 47 respectively. The control for energizing these solenoids and for effecting operation of the refrigerating machine for cooling of the indoor air has not been disclosed, as it is not necessary for an understanding of the present invention, it being understood that any suitable manual or automatic control may be employed. Upon energization of the coils 51 and 52 the valves 18 and 47 are reversed so that the valve 18 connects the discharge line 17 of the compressor to the inlet 39 of the unit 13, and the valve 47 connects the heat exchanger 35 to receive vaporized refrigerant from the heat transfer unit 14 through the line 30. Under this condition of operation the hot compressed refrigerant is delivered to the outdoor unit 13 and the heat is dissipated to the outdoor air by operation of the fans 41 and 42, the liquefied refrigerant flowing to the receiver 32 through a connection 53 and a check valve 54. The liquid then flows through the connection 34 and heat exchanger 35 to the heat transfer unit 14 under control of a thermostatic expansion valve 55 provided with a control bulb 56 responsive to the temperature of the outlet line 39 of the unit 14.

The capacity of a heat pump to supply adequate heating of an enclosure during winter weather is normally in excess of that required for cooling in the summertime in the same locality. Thus the reduced capacity of the compressor may be sufficient throughout the entire summer season and it is desirable to minimize the capacity required to meet the heating requirements during the winter. Accordingly, the heat pump described herein is arranged to provide effective utilization of capacity throughout the winter season including conditions of severe or peak load requirements, and this invention is directed particularly toward securing effective use of the heat pump capacity throughout the winter season and toward making it unnecessary to provide a large amount of excess capacity in order to meet peak load conditions in heat pumps which utilize outdoor air as a source of heat.

Referring again to the drawing and considering the operation of the system during the heating cycle when the valves 18 and 47 are in their heating positions as illustrated, it is readily apparent that the compressor arrangement provides half or full capacity operation, as required by operation of the solenoid valve 22; however, as severe weather conditions occur, a reasonably sized compressor and evaporator will be insufficient to supply the demand because of the low temperature of the air used as the heat source. In order to meet these conditions, a heat storage tank 57 is provided and an evaporator or heat transfer coil 58 is arranged in a tank 59 connected to the tank 57 so that the water or other liquid in the tank may be circulated over the evaporator 58. The storage liquid is maintained at a predetermined desired temperature by operation of an electric heater 60 under control of a suitable thermostat 61 having a temperature bulb or feeler 62 in the tank 59. When additional capacity of the heat pump is required, the coil 58 is connected in the refrigerant circuit by opening a solenoid valve 63. Liquid refrigerant is then supplied to the coil 58 through a liquid line 64 under control of a thermostatic expansion valve 65. Valve 65 is provided with a feeler bulb 66 on the suction line of the evaporator 58 in a conventional manner, and refrigerant vaporized in the coil 58 is returned to the compressor through a suction line 67 having branches connected to high pressure inlets of the cylinders 15 and 16 through check valves 68 and 69 respectively. In order to secure effective operation of the auxiliary evaporator 58 while maintaining operation of the system to withdraw heat from the outdoor air, the compressor 12 is made of the so-called multiple effect type. Compressors of this type are provided with high pressure and low pressure inlets, and during the main portion of the stroke of the compressor piston gas is received from the low pressure inlet. Near the end of the stroke the high pressure inlet is opened and gas therefrom flows into the cylinder, the low pressure inlet valve being closed automatically upon admission of the higher pressure gas. In the drawing the cylinder 15 has been shown in section and it will be noted that the suction line 49 communicates with the crankcase of the compressor. Thus an inlet valve 70 located on the top of the piston shown at 71 allows gas to flow into the cylinder until the piston has reached a position to uncover its high pressure port indicated at 72, whereupon gas is received from one branch of the suction line 67. Upon the return stroke after the port 72 has been closed, the gas is discharged through an exhaust valve 73 in the head of the compressor and enters the discharge line 17. The construction of the cylinder 16 is the same as that of the cylinder 15. The check valves 68 and 69 are preferably located as close to the cylinders 15 and 16 as possible to prevent reverse flow of refrigerant to the suction line 67 and minimize the effective volume of the cylinders when the side parts are open and the valve 63 closed. In order to regulate the refrigerant pressure at the compressor intakes to a predetermined value a pressure regulating valve 74 is connected in the line 67 and is responsive to the pressure therein through a pressure duct 75.

From the foregoing it will be readily apparent that during the normal operation of the compressor 12 when the valve 63 is closed and evaporator 58 is not being used, the full capacity of the compressor is available. Thus when the temperature of the air flowing over the heat transfer unit 13 as an evaporator is high the system operates at a favorable coefficient of performance. As the temperature of the outdoor air becomes lower the coefficient of performance of the system is lower, and at some predetermined low temperature the auxiliary evaporator 58 is brought into operation and will increase the capacity of the system as a whole while maintaining the operation of the evaporator 13 to obtain heat from the outdoor air.

The capacity of the heat storage tank 57 is made sufficient to carry peak loads for short periods during severe winter weather. In the event of prolonged severe weather the temperature of the water flowing through the casing 59 may become sufficiently low that freezing could result, and in order to avoid this possibility a low temperature limit thermostat 76 is provided to deenergize the valve 63 through a suitable control to be described later and stop the supply of refrigerant to the coil 58. The thermostat 76 is provided with a feeler bulb 77 responsive to the temperature of the water in the tank 59.

The manner in which the system described above is controlled in order to effect the operation described will more readily be apparent from a consideration of Fig. 2, which shows the electrical control circuit for actuating the several control elements of the system. Referring now to Figs. 1 and 2, the heat pump is controlled by three outdoor thermostats 78, 79 and 80 respectively and by an indoor thermostat 81. In the following description of the operation of the system it will be assumed that the operation is effected at certain temperatures of the outdoor and indoor air although it will be understood that any suitable control temperatures and ranges of operation may be employed depending upon the characteristics of each particular system under consideration.

Assuming now that the system has been set for winter operation and that the valves 18 and 47 are in their positions as illustrated, as the outdoor air temperature becomes lower and reaches a value of, say, 70° F. the thermostat 78 will close its contacts. This prepares a circuit from the thermostat 78 through a relay 82 to a line 83, which is common to one side of the compressor motor, the indoor fan motor 25, the outdoor fan motor 43, and a relay 84 arranged to energize an operating coil 85 of the solenoid 22. The other terminals of these three motors and of the coil 85 are connected to one side 86 of the electric power supply line. If now the temperature within the enclosure falls to, say, 75° F., the thermostat 81 will close its upper contacts and connect the above described circuit to the other side of the power line indicated at 87. In addition to energizing the motors 9, 25, and 43 and the solenoid winding 85, the thermostat 81 prepares a circuit to a coil 88 of a relay 89. The system now operates at half capacity, the cylinder 16 being unloaded by opening of the valve 22. Furthermore, only the blower 41 is maintained in operation, so that a reduced amount of outdoor air is circulated over the evaporator 13.

Should the outdoor air temperature continue to fall to, say, 45° F., the thermostat 79 would close both its contacts. The closing of these contacts has no effect on the system other than the preparation of circuits connected to a lower stationary contact 90 of the thermostat 81. If now the room temperature falls to a value below, say, 73° F., the thermostat 81 will close its lower contacts and complete a circuit from the line 87 through a solenoid 91 of the relay 82 to the line 83, thereby opening the contacts of the relay 82. This prevents energization of the relay coil 88 except when the upper contacts of the thermostat 81 are closed. Closing of the lower contacts of the relay 81 also completes a circuit through the right-hand contacts of the thermostat 79 to start the other outdoor blower motor 44 and to energize solenoids 92 and 93. Energization of the solenoid 92 opens the relay 84, deenergizes the coil 85, and closes the by-pass valve 22. Thus the entire compressor capacity is made available by connecting the cylinder 16 to discharge through the check valve 21 to the discharge line 17. Energization of the solenoid 93 opens the contacts of a relay 94 and prevents energization of the heater 60 in the storage tank circuit. The operation of the system at full compressor capacity thus continues under control of the room thermostat 81, it being understood that the contacts of this thermostat are opened and closed in accordance with room temperature in the manner commonly employed in temperature control systems. The opening of the contacts 94 in the circuit of the heater 60 prevents energization of the heater when the compressor is operating at full load capacity; however, operation of the heater is again effective when the lower contacts of the thermostat 81 are opened.

A second relay 95 is arranged to control the heater circuit and is provided with a coil 96 connected between the lines 86 and 87 and controlled by a clock or timer 97 which maintains the circuit closed during the heating season. The contacts of the temperature control thermostat 61 are also arranged in this circuit to control the energization of the heater during the heating season.

Should the outdoor temperature continue to fall to a value of, say, 25° F., for the locality assumed this would indicate a peak load condition, normally of temporary duration. Upon the occurrence of this low temperature the thermostat 80 closes both sets of contacts. Closing of the left-hand contacts energizes coil 88 and opens the contacts of the relay 89 thereby cutting out the right-hand contacts of the thermostat 79 and maintaining the energization of the motor 44 and coils 92 and 93 under control of the thermostat 80. The closing of the right-hand contacts of the thermostat 89 energizes a solenoid 98 of the valve 63 so that liquid refrigerant is admitted to the evaporator 58 under control of the thermostatic expansion valve 65. The contacts of the low temperature thermostat 76 are also arranged in the circuit of the solenoid 98 so that upon decrease of the temperature of the storage water below a predetermined value the solenoid valve 63 will be closed to prevent further refrigeration of the storage water.

Under this last condition of operation the compressor is operated as a multiple effect compressor, refrigerant being admitted to the high pressure ports from the evaporator 58, and the system is maintained in operation during the existence of the peak load condition, as determined by the operation of the thermostat 80.

Upon rise of the temperature of the outdoor air, the several operations described above take place in the opposite direction, the thermostat 80 opening first, followed by the thermostat 79 at about 45° F. and the thermostat 78 at 70° F.

It will be obvious to those skilled in the art that storage of hot water is not the only possible source of auxiliary heat. For example, the auxiliary evaporator 58 might be supplied with a flow of water from any source substantially above 32° F.; alternatively, evaporator 58 might be buried in the ground and arranged to extract heat for short periods from the contiguous soil.

In the modification illustrated in Fig. 3, only a portion of the system adjacent the compressor has been illustrated, as the remainder of the system is the same as that shown in Fig. 1 and corresponding parts have been designated by the same numerals. This system, instead of employing a compressor of the multiple effect type, employs a compressor 99 having two cylinders 100 and 101. A valve 102 is provided in the suction connection of the cylinder 101; this valve is normally in its left-hand position, as shown in the drawing, so that both the cylinders 100 and 101 are connected to the suction line 49. The valve may be shifted by energization of a solenoid winding 103 so that in its right-hand position it breaks the connection between the intakes of the two cylinders and connects the intake of the cylinder 101 with the suction line 67 of the auxiliary evaporator 58. During normal operation of the system the cylinders 100 and 101 are connected to the refrigerant circuit in the same manner as the cylinders 15 and 16 of the compressor 12 in Fig. 1, the by-pass solenoid valve 22 being actuated in the same manner so that the compressor may be operated either at full or partial capacity depending upon the load requirements. In the event that there is a demand for additional heat from the storage tank 57 as determined by the outdoor thermostat 80, the valve 102 is actuated by energization of the winding 103 and is shifted to its right-hand position so that the cylinder 101 is removed from the main refrigerant circuit and its intake connected as the auxiliary intake of the compressor to withdraw refrigerant from the auxiliary evaporator 58; the gas compressed in the cylinder 101 is discharged through the check valve 21 to the line 17 in the same manner as during normal operation. Thus a part of the total capacity of the compressor is made available to remove heat from the auxiliary source during those conditions of operation when adequate heat cannot be secured from the main outdoor heat exchanger 13.

The control circuit for regulating the operation of the system when employing the compressor of Fig. 3 is in all respects the same as that shown in Fig. 2 except that the circuit of the right-hand member of the thermostat 80 is modified to include the actuating coil 103. A modification of this portion of the circuit is shown in Fig. 4 where operating winding 103 of the valve 102 is shown connected in series with the coil 98 which actuates the valve 63. It is thus apparent that whenever the valve 63 is opened to admit refrigerant to the evaporator 58 the valve 102 is also conditioned to place the cylinder 101 in operation to withdraw refrigerant from the evaporator 58 and supply it to the main circuit of the system.

From the foregoing it is readily apparent that a heat pump of the air source type has been provided which may be operated over a wide range of outdoor temperatures without requiring compressor and evaporator capacity greatly in excess of that required during average load conditions, the heat storage capacity or other auxiliary heat source being employed during peak conditions in a manner to secure effective operation of the system.

Although the invention has been described in connection with a particular arrangement and control for a heat pump, other applications will readily be apparent to those skilled in the art, and is not, therefore, desired that the invention be limited to the specific arrangements illustrated and described and it is intended by the appended claims to cover all modifications which fall within the spirit and scope of the invention.

What I claim as new and desire to secure by Letters Patent of the United States is:

1. A fluid heating system comprising a refrigerating machine having an evaporator and a condenser and a compressing unit connected in a refrigerant circuit, said compressing unit being arranged to discharge compressed refrigerant to said condenser and having a main intake and an auxiliary intake, said main intake being connected to receive vaporized refrigerant from said evaporator, means for circulating over said condenser a fluid to be heated, means for circulating over said evaporator a fluid heat source, means providing a second source of heat, means including a second evaporator and connected to deliver vaporized refrigerant to said auxiliary intake for removing heat from said second source, separably operable means for respectively effecting the admission of gaseous refrigerant from said two intakes during the operation of said unit whereby one portion of the capacity of said compressing unit may be employed to continuously withdraw gas from said first mentioned evaporator and a second portion to intermittently withdraw gas from said second evaporator, and means dependent upon a predetermined low temperature of said fluid heat source for rendering said last mentioned means effective to deliver liquid refrigerant from said condenser to said second evaporator simultaneously with the delivery of refrigerant to said first mentioned evaporator and remove heat from said second source.

2. A fluid heating system comprising a refrigerating machine having an evaporator and a condenser and a compressing unit connected in a refrigerant circuit, said compressing unit being arranged to discharge compressed refrigerant to said condenser and having a main intake and an auxiliary intake, said main intake being connected to receive vaporized refrigerant from said evaporator, means for circulating over said condenser a fluid to be heated, means for circulating over said evaporator a fluid heat source, means providing a second source of heat, means including a second evaporator and connected to deliver vaporized refrigerant to said auxiliary intake for removing heat from said second source whereby a portion of the total capacity of said unit may be transferred to said second evaporator, and means dependent upon a predetermined low temperature of said fluid heat source for delivering liquid refrigerant from said condenser to said second evaporator simultaneously with the delivery of refrigerant to said first mentioned evaporator to render said second evaporator operative to utilize a portion of the capacity of said unit to remove heat from said second source.

3. A fluid heating system comprising a refrigerating machine having an evaporator and a condenser and a compressing unit connected in a refrigerant circuit, said compressing unit having a capacity divisible into first and second portions being arranged to discharge compressed refrigerant to said condenser, and said circuit including a connection for delivering vaporized refrigerant from said evaporator to said compressing unit, means for circulating over said condenser a fluid to be heated, means for circulating over said evaporator a fluid heat source, means providing a second source of heat, means including a second evaporator and utilizing said second portion of the capacity of said compressing unit for delivering vaporized refrigerant from said second evaporator to said unit to remove heat from said second source whereby said second portion of the total capacity of said unit may be transferred from said first mentioned evaporator to said second evaporator, and means dependent upon a predetermined low temperature of said fluid heat source for delivering liquid refrigerant from said condenser to said second evaporator simultaneously with the delivery of refrigerant to said first mentioned evaporator to render said second evaporator operative to utilize a portion of the capacity of said unit to remove heat from said second source.

4. A fluid heating system comprising a refrigerating machine having an evaporator and a condenser and a compressor connected in a refrigerant circuit, said compressor having a high pressure intake and a low pressure intake, said low pressure intake being connected to receive vaporized refrigerant from said evaporator, means for circulating over said condenser a fluid to be heated, means for transferring heat from the outdoor air to said evaporator, means providing a second source of heat, means including a second evaporator and connected to deliver vaporized refrigerant to said high pressure intake for removing heat from said second source, and means dependent upon a predetermined low temperature of the outdoor air for delivering liquid refrigerant from said condenser to said second evaporator simultaneously with the delivery of refrigerant to said first mentioned evaporator to render said second evaporator operative to remove heat from said second source.

5. A fluid heating system comprising a refrigerating machine having an evaporator and a condenser and a compressor connected in a refrigerant circuit, said compressor having a high pressure intake and a low pressure intake, said low pressure intake being connected to receive vaporized refrigerant from said evaporator, means for circulating over said condenser a fluid to be heated, means for circulating outdoor air over said evaporator to supply heat to said system, means providing a second source of heat independent of the temperature of the outdoor air, means including a second evaporator and connected to deliver vaporized refrigerant to said high pressure intake for removing heat from said second source, and means responsive to a predetermined low temperature of the outdoor air for delivering liquid refrigerant from said condenser to said second evaporator simultaneously with the delivery of refrigerant to said first mentioned evaporator to render said second evaporator operative to remove heat from said second source.

6. A fluid heating system comprising a refrigerating machine having an evaporator and a condenser and a compressor connected in a refrigerant circuit, said compressor having a high pressure intake and a low pressure intake, said low pressure intake being connected to receive vaporized refrigerant from said evaporator, means for circulating over said condenser a fluid to be heated, means for transferring heat from the outdoor air to said evaporator, means providing a second source of heat, means including a second evaporator and connected to deliver vaporized refrigerant to said high pressure intake for removing heat from said second source, means dependent upon a predetermined low temperature of the outdoor air for delivering liquid refrigerant from said condenser to said second evaporator simultaneously with the delivery of refrigerant to said first mentioned evaporator to render said second evaporator operative to remove heat from said second source, and pressure regulating means for maintaining at a predetermined value the refrigerant pressure at said high pressure intake.

7. A fluid heating system comprising a refrigerating machine having an evaporator and a condenser and a compressor connected in a refrigerant circuit, said compressor having a high pressure intake and a low pressure intake, said low pressure intake being connected to receive vaporized refrigerant from said evaporator, means for circulating over said condenser a fluid to be heated, means for circulating outdoor air over said evaporator to supply heat to said system, means providing a second source of heat independent of the temperature of the outdoor air, means including a second evaporator and connected to deliver vaporized refrigerant to said high pressure intake for removing heat from said second source, means responsive to a predetermined low temperature of the outdoor air for delivering liquid refrigerant from said condenser to said second evaporator simultaneously with the delivery of refrigerant to said first mentioned evaporator to render said second evaporator operative to remove heat from said second source, and means responsive to the temperature of said second source for rendering said last mentioned means ineffective to supply liquid refrigerant to said second evaporator.

8. A fluid heating system comprising a refrigerating machine having an evaporator and a condenser and a reciprocating compressor connected in a refrigerant circuit, said compressor having a low pressure intake provided with a valve for admitting gaseous refrigerant thereto throughout the major portion of the stroke of the piston of said compressor and having a high pressure intake port located to be opened near the end of the intake stroke of the piston, said low pressure intake being connected to receive vaporized refrigerant from said evaporator, means for circulating over said condenser a fluid to be heated, means for transferring heat from the outdoor air to said evaporator, means providing a second source of heat, means including a second evaporator and connected to deliver vaporized refrigerant to said high pressure port for removing heat from said second source, and means dependent upon a predetermined low temperature of the outdoor air for delivering liquid refrigerant from said condenser to said second evaporator simultaneously with the delivery of refrigerant to said first mentioned evaporator to render said second evaporator operative to remove heat from said second source.

DAVID W. McLENEGAN.

REFERENCES CITED

The following references are of record in the file of this patent:

UNITED STATES PATENTS

| Number | Name | Date |
|---|---|---|
| 2,123,497 | Buchanan | July 12, 1938 |
| 2,148,415 | Labberton | Feb. 21, 1939 |
| 2,154,136 | Parcaro | Apr. 11, 1939 |
| 2,207,728 | Goodman | July 16, 1940 |
| 2,221,688 | Gibson | Nov. 12, 1940 |
| 2,241,070 | McLenegan | May 6, 1941 |